E. CARLSON.
SHEET METAL SASH AND DOOR.
APPLICATION FILED APR. 2, 1913.
Reissued Apr. 28, 1914. 13,720.
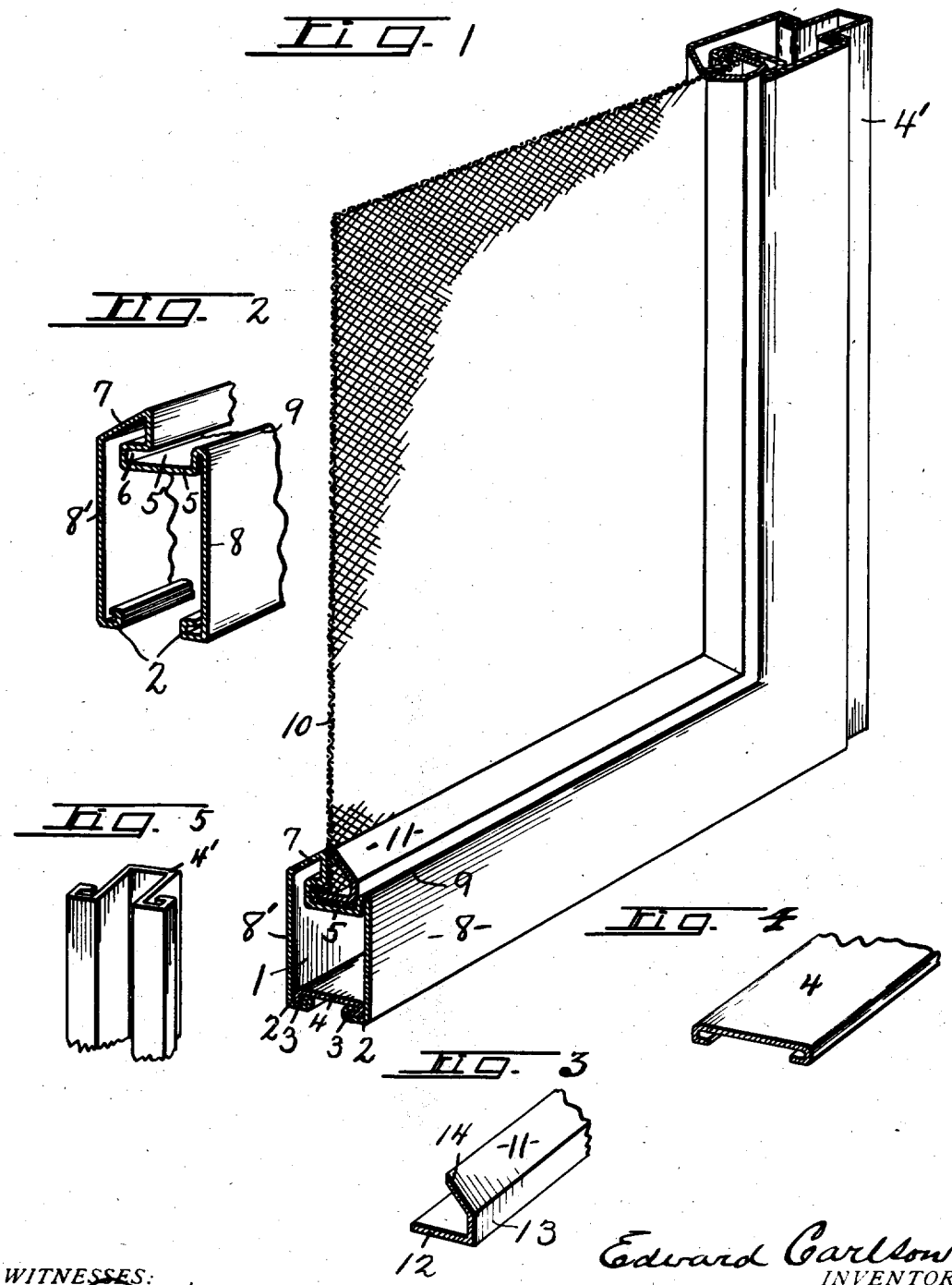
WITNESSES:
H. W. Hurst
E. A. Thompson
Edward Carlson
INVENTOR.
BY Howard P. Denison
ATTORNEY.

UNITED STATES PATENT OFFICE.

EDVARD CARLSON, OF JAMESTOWN, NEW YORK, ASSIGNOR TO JAMESTOWN WINDOW SCREEN COMPANY, OF JAMESTOWN, NEW YORK, A CORPORATION OF NEW YORK.

SHEET-METAL SASH AND DOOR.

13,720. Specification of Reissued Letters Patent. Reissued Apr. 28, 1914.

Original No. 1,005,509, dated October 10, 1911, Serial No. 625,124. Application for reissue filed April 2, 1913. Serial No. 758,516.

*To all whom it may concern:*

Be it known that I, EDVARD CARLSON, a subject of the King of Sweden, residing at Jamestown, in the county of Chautauqua and State of New York, have invented certain new and useful Improvements in Sheet-Metal Sashes and Doors; and I do hereby declare the following to be a full, clear, and exact description of the invention, such as will enable others skilled in the art to which it appertains to make and use the same.

This invention relates to certain improvements in sheet metal sash and doors.

The main object is to produce a hollow sheet metal sash with a minimum number of parts which may be economically constructed and assembled in such manner as to produce a light, strong and durable frame capable of firmly retaining in place a screen, glass or other panel.

Another object is to provide means whereby the panel-retaining strips will more firmly retain the screen or other panel in operative position and at the same time allow such strips to be more easily and quickly replaced in operative position or removed without displacing, destroying or otherwise mutilating any of the parts of the frame.

Other objects and uses will be brought out in the following description.

In the drawings—Figure 1 is a perspective view of a portion of the frame and screen therein. Fig. 2 is an enlarged perspective view of a small portion of the main body of the frame. Figs. 3 and 4 are fragmentary perspective views of the screen retaining strip and the closing strip. Fig. 5 is a detail perspective view of a portion of the closing strips for one of the side rails.

Referring to the drawing, the numeral —1— designates in general a continuous hollow frame consisting of bottom, top and side rails formed from a strip of thin sheet metal bent in substantially U-shape cross sectional formation with its open side facing outwardly. The free edges of the sides of the rails are bent inwardly at —2— and interlocked at —3— with the returned edges of a closing strip —4—. The central lengthwise portions of the closing strip for the upright side rails are pressed outwardly forming hollow ribs —4′— for engagement in the guides of an ordinary window frame or casing. The inner sides —5— of the rails of the frame are pressed outwardly to form lengthwise recesses —5′— and opposite inwardly projecting parallel ribs —7— and —9— forming the opposite sides of the recess —5′—, the depressed inner sides —5— of the rails running parallel with their respective closing strips or tie pieces —4— and —4′—.

The inturned outer edges of the hollow rails and also the ribs —7— and —9— serve to reinforce and to stiffen the hollow rails against buckling and permits the use of comparatively thin sheet metal which is easily bendable to the desired form.

The ribs —7— and —9— are spaced a sufficient distance apart to receive between them the edge of a screen —10— or other panel and a suitable retaining strip —11— shown more clearly in Figs. 1 and 3, the portion of the rib —7— being offset laterally from the recess —5′— to form a groove —6— for a purpose hereinafter described. The inner edge of the rib —7— is disposed in a substantially flat vertical plane to form a rest or abutment against which the adjacent portion of the screen is held by the retaining strip —11—.

The rib —9— forming one side of the recess —5′— is disposed to the open side of the groove —6— and forms an abutment to hold the retaining strip —11— in locking engagement with the screen.

The retaining strips —11— extend from end to end of the inner edges of the respective rails, said strips being substantially U-shape in cross section, thereby forming flanges —12— and —14— which are disposed at an angle with each other and are connected by a relatively narrow web —13— disposed at substantially right angles to the flange —12—. The transverse width of the flange —12— is slightly greater than that of the open inner side of the recess —5′— into which it is adapted to be inserted with the web —13— in contact with the inner face of the rib —9— thereby causing the opposite edge of the flange —12— to project into the groove —6—. The transverse width of the angular flange —14— is slightly less than the corresponding width of the recess —5′— and adapted to press the screen or other panel firmly against the opposing face of the rib —7— when the retaining strip is placed in operative position.

The opposite sides as —8— and —8′— of the hollow rails forming the frame —1— are substantially parallel transversely and longitudinally, the rib —9— being integral with the inner edge of the side —8—, while the rib —7— is integral with the inner edge of the side —8′—, thus permitting the remaining portions of the sides to be extended outwardly and transversely any desired width for various sizes of sash and doors.

It will be seen that the inner side of the rib —7— and flange —14— of the retaining piece —11— converge inwardly from the sides of the rail at an angle of substantially 45°, thereby bracing these portions of the frame against lateral strains and at the same time giving to the frame a neat and characteristic appearance.

The screen as —10— is stretched tightly across the opening in the frame from side to side and from end to end with its edges projecting into the recess —5′— and against the inner sides —5— of the rails so as to lie across the open sides of the grooves —6—. The retaining pieces —11— are then placed in operative position under pressure sufficient to force the flanges —12— against the screen into the grooves —6—, until the webs —13— are firmly engaged with the ribs —9—, the pressure of the flanges —12— against the edges of the screen tending to draw such edges across the flanges —7— and into the grooves —6— so as to additionally tighten the screen. During this operation of inserting the retaining pieces —11— in their holding positions, it will be seen that the pressure of the flanges —12— upon the edges of the screen is transversely of the frame or rail and at substantially right angles to the rib —9— so that the tension upon the edges of the screen is opposed by said rib tending to hold the retaining piece in operative position. The retaining piece —11— is sufficiently resilient or spring-like to enable it to be sprung into position and when in operative position, the inner edge of the flange —14— will approximately coincide with the corresponding edge of the rib —7—.

It will be seen from the foregoing description that in tightening the screen in the frame, the retaining strip —11— will have to be forced or sprung into the recess —5′— between the ribs —7— and —9— and by this act will not only firmly tighten and hold the screen but will also be self-retaining by reason of the lateral pressure exerted by the screen upon the retaining strip tending to hold it firmly against the rib —9—. It is evident, however, that these strips may be easily removed by inserting a suitable tool such as a screw-driver between the rib —9— and adjacent web —13— so as to spring the intermediate portion of the strip inwardly a sufficient distance to disengage it from said rib, thereby allowing the strip to be withdrawn laterally and at the same time freeing the screen. In like manner other panels, such as glass or wood may be securely fastened in the frame by the retaining strips —11— although in such cases the edges of the panel might be allowed to rest upon the flanges —12—. That is, in inserting the retaining strips, the flanges —12— would be forced across the edges of the panel until the webs —13— were engaged with the ribs —9—, the flanges —14— serving to engage the panel under yielding pressure to force it firmly against the rib —7—.

What I claim is:

1. A device such as described for securing the edge of a sheet of fabric within a frame, and consisting of a continuous hollow frame formed by pressing a strip of thin metal in substantially U-shaped cross sectional formation, the free edges of said frame being bent inward and interlocked with the edges of a closing strip, the bottom of the U-shaped frame pressed inwardly to form a recess, the bottom of which is substantially parallel to the closing strip, one side of this recess extending into a groove, the other side depressed slightly below the upper edge of the upright side of the frame, thereby forming a lip, the edge of the fabric placed in this recess, and a closing strip adapted to be retained within the recess by its spring action, and consisting of a strip of thin metal having a horizontal section slightly narrower than the recess formed in the frame, a vertical section formed on one side, the upper part of which is bent inwardly at approximately 45° to register with the upper edge of the frame, substantially as and for the purposes set forth.

2. A hollow sheet metal rail for sash and door frames having its inner edge depressed beyond the corresponding edges of its sides to form opposite lengthwise ribs and an intervening recess, one of the ribs having its inner edge offset laterally toward the other rib to form a lengthwise groove opening into the recess, and a retaining strip inserted in the recess and provided with laterally diverging flanges for engaging and retaining the panel in the recess.

3. A sash or door comprising a hollow sheet metal frame provided with a recess in its inner side, a rib forming one side of the recess and an additional rib forming the other side of the recess and overhanging a portion of the same, in combination with an angular retaining strip having one side interposed between said ribs and its other side extending across said recess into substantial registration with the edge of the opposite rib.

4. A hollow sheet metal rail for screen frames bent in U-shape form and having its closed edge depressed beyond the adjacent edges of the sides to form opposite ribs and an intervening recess, a screen retaining piece inserted in the recess between said ribs and having one side engaged with one of the ribs and provided with diverging flanges extending toward the other rib.

5. A hollow sheet metal rail for screen frames bent in U-shape form and having its closed edge depressed beyond the adjacent edges of the sides to form opposite ribs and an intervening recess, a screen retaining piece inserted in the recess between said ribs and having one side engaged with one of the ribs and provided with diverging flanges extending toward the other rib, and a closing piece connecting the opposite edges at the open side of the rail.

6. A rail for screen frames having its inner edge provided with a central lengthwise recess and lengthwise ribs at opposite sides of the recess, the open side of the recess being narrower than its base, and a screen retaining strip having diverging flanges united by a web bearing against the inner side of one of the ribs, one of said flanges being disposed in the wider portion of the recess and its other flange projecting across the narrower open side of the recess.

7. A hollow sheet metal frame for sash and doors having lengthwise ribs and an intervening recess along its inner edge, one of the ribs having its inner edge offset laterally toward the other rib to form an overhanging portion, a panel in said recess and an angular retaining strip having a portion extending under said overhanging portion and another portion extending outwardly from said recess.

In witness whereof I have hereunto set my hand on this 14th day of March 1913.

EDVARD CARLSON.

Witnesses:
F. B. Worden,
D. E. Burke,
H. M. Anderson.